(12) United States Patent
Popovich (10) Patent No.: US 6,473,209 B1
(45) Date of Patent: Oct. 29, 2002

(54) APPARATUS FOR PRODUCING A THREE-DIMENSIONAL IMAGE

(75) Inventor: Milan M. Popovich, Leicester (GB)

(73) Assignee: DigiLens, Inc., Sunnyvale, CA (US)

( * ) Notice: Subject to any disclaimer, the term of this patent is extended or adjusted under 35 U.S.C. 154(b) by 145 days.

(21) Appl. No.: 09/632,664

(22) Filed: Aug. 4, 2000

Related U.S. Application Data (60) Provisional application No. 60/147,434, filed on Aug. 4, 1999.

(51) Int. Cl.[7] ................................................. G03H 1/26
(52) U.S. Cl. ............................ 359/22; 359/15; 359/24; 349/1; 349/5; 348/41; 353/31
(58) Field of Search ........................... 359/13, 15, 22, 359/24, 32; 349/1, 5, 201; 348/40, 41; 353/31, 30

(56) References Cited

U.S. PATENT DOCUMENTS

| | | |
|---|---|---|
| 3,807,829 A | 4/1974 | Close |
| 4,458,981 A | 7/1984 | Huignard |
| 4,500,163 A | 2/1985 | Burns et al. |
| 4,566,031 A | 1/1986 | Kirk |
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,981,332 A | 1/1991 | Smith et al. |
| 4,993,790 A | 2/1991 | Vick |
| 5,011,244 A | 4/1991 | Smith et al. |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,103,323 A | 4/1992 | Magarinos |
| 5,111,313 A | 5/1992 | Shires |
| 5,151,724 A | 9/1992 | Kikinis |

(List continued on next page.)

FOREIGN PATENT DOCUMENTS

| | | | |
|---|---|---|---|
| WO | 98/04650 | 2/1998 | |
| WO | WO-00-07061 A | 7/1999 | ........... G02B/27/22 |

*Primary Examiner*—Cassandra Spyrou
*Assistant Examiner*—Fayez Assaf
(74) *Attorney, Agent, or Firm*—Campbell Stephenson Ascolese LLP (57) ABSTRACT

Described herein is an apparatus for producing three-dimensional staic or moving images. In one embodiment, the apparatus includes an image generator and an optical device. The image generator generates a plurality of image elements including first and second image elements. In one embodiment the image elements constitute coherent beams of light encoded with image information, wherein the coherent beams of light are sequentially generated by one or more laser scanners of the image generator. The optical device receives the plurality of image elements on a first planar surface thereof and, in response, produces first output light rays and second output rays corresponding to the first and second image elements, respectively. The first and second output light rays, when seen by an observer, appear to originate from first and second common points, respectively. The first and second common points are spaced from each other and from the first planar surface. Moreover, the first and second common points are spaced from the first planar surface in a direction perpendicular to the first planar surface.

14 Claims, 11 Drawing Sheets

U.S. PATENT DOCUMENTS

| | | |
|---|---|---|
| 5,153,670 A | 10/1992 | Jannson et al. |
| 5,221,957 A | 6/1993 | Jannson et al. |
| 5,227,898 A | 7/1993 | Iavecchia et al. |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,418,631 A | 5/1995 | Tedesco et al. |
| 5,424,866 A | 6/1995 | Kikinis |
| 5,440,428 A | 8/1995 | Hegg et al. |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,581,378 A | 12/1996 | Kulick |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. |
| 5,744,267 A | 4/1998 | Meerholz et al. |
| 5,745,203 A | 4/1998 | Valliath et al. |
| 5,748,828 A | 5/1998 | Steiner et al. |
| 5,751,243 A | 5/1998 | Turpin |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Louiseaux et al. |
| 5,790,284 A | 8/1998 | Taniguchi et al. |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,759 A | 9/1998 | Okamori et al. |
| 5,815,222 A | 9/1998 | Matsuda et al. |
| 5,822,029 A | 10/1998 | Davis et al. |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,894,359 A * | 4/1999 | Suzuki et al. ................. 359/15 |
| 5,942,157 A | 8/1999 | Sutherland et al. |

\* cited by examiner

APPARATUS FOR PRODUCING A THREE-DIMENSIONAL IMAGE

RELATED APPLICATIONS

This application claims priority to provisional patent application entitled "Apparatus For Producing A Three-Dimensional Image," Ser. No. 60/147,434 filed on Aug. 4, 1999.

The following patent application is hereby incorporated by reference in its entirety as though fully and completely set forth herein: "Holographic Illumination System," Ser. No. 09/395,889, now U.S. Pat. No. 6,115,152 filed Sep. 14, 1999.

BACKGROUND OF THE INVENTION

1. Field of the Invention

The invention relates generally to image projection systems, and particularly to systems for the projection of three-dimensional images.

2. Description of the Related Art

Three-dimensional image displays have long been of interest in a variety of technical applications. Several techniques are known in the prior art for producing three-dimensional images. These techniques include computer graphics which simulate three-dimensional images on a two-dimensional display; stereoscopic displays which mentally fuse two retinal images (left and right) into one image; holographic images which reconstruct the actual wavefront structure reflected from an object; and volumetric displays which create three-dimensional images having real physical height, depth, and width by activating actual light sources within the volume of the display.

U.S. Pat. No. 5,764,317 (the 317 Patent) entitled 3-D Volume Visualization Display describes another technique for generating a three-dimensional image. The 317 Patent employs a volumetric multi-layer screen including a plurality of layers of electrically switchable polymer dispersed liquid crystal (PDLC) film separated by thin transparent dielectric films (or by sheets of glass) coated with transparent electrodes. It is the optical properties of the PDLC that are electrically switchable. Specifically the PDLC film acts as a diffuser when no voltage is applied. Further, under voltage, the film becomes fully transparent. The screen is switchable from a diffusing (scattering) state to a transparent state. Three-dimensional image data is stored in a host computer coupled to the volumetric screen, and the image date is subsequently provided to a liquid crystal television in frame sequences. Each frame is displayed by the liquid crystal television, which has an array of switchable pixels, while light from a lamp passes therethrough to generate a number of cross-sectional images (slices) perpendicular to the direction of viewing. Each image projected by the liquid crystal television is synchronized in time with the activation of one layer of the volumetric screen. By sequentially repeating this process for each image slice (each respective display layer), the observer, it is said, will see a full three-dimensional image within the space encompassing the volumetric screen. If the switching time for the screens is within the range of the persistence of human vision, the consecutively projected slices will be eye integrated into a volumetric image.

The liquid crystal television of the 317 Patent transmits light from the lamp in a pattern formed by switchable pixels in accordance with a frame of image data. Displays in liquid crystal televisions are generally fabricated with microelectronics processing techniques. Each pixel in the display is a region whose transmissive properties can be controlled by an electrical signal. In the liquid crystal television, lamp light incident on a particular pixel is either fully transmitted, partially blocked, or fully blocked by the pixel, depending on the signal applied to that pixel. The transmission of lamp light through any pixel can be varied in steps (gray levels) over a range extending from a state where light is substantially blocked to the state in which incident light is substantially transmitted.

When lamp light is transmitted through the liquid crystal television, the lamp light gains a spatial intensity profile that depends on the transmission state of the pixel array. An image is formed at the liquid crystal television by adjusting the transmission (or gray level) of the pixels to correspond to a desired image.

Holograms may be used to reproduce the effects of a conventional optical element, such as a static lens or a mirror. In certain cases, where complex optical operations are not being reproduced, "holographic optical elements" (HOEs) may be based on simple diffraction gratings. These HOEs may be far easier and less expensive to produce than their glass counterparts, especially when the optical element is complicated or must meet stringent tolerances. HOEs can be compact, lightweight and wavelength-specific, which allows more flexibility in designing optical systems. HOEs may be used to replace individual optical elements, groups of elements, and in some cases, entire systems of conventional optical elements.

SUMMARY OF THE INVENTION

Described herein is an apparatus for producing three-dimensional static or moving images. In one embodiment, the apparatus includes an image generator and an optical device. The image generator generates a plurality of image elements including first and second image elements. In one embodiment the image elements constitute coherent beams of light encoded with image information, wherein the coherent beams of light are sequentially generated by one or more laser scanners. The optical device receives the plurality of image elements on a first planar surface thereof and, in response, produces first output light rays and second output rays corresponding to the first and second image elements, respectively. The first and second output light rays, when seen by an observer, appear to originate from first and second common points, respectively, which are spaced from each other in the direction of the observer's view. In other words, the first and second common points are spaced from each other and from the first planar surface, and the first and second common points are spaced from the first planar surface in a direction perpendicular to the first planar surface. Additionally, mirrors may be employed to enlarge the projected three-dimensional.

In one embodiment, the optical device includes first and second switchable holographic optical elements (SHOEs). The first SHOE is configured to receive the first image element and is switchable between an active state and an inactive state. In the active state, the first SHOE is configured to diffuse the first image element into the first output rays. When operating in the inactive state, the first SHOE is configured to transmit the first image element without substantial alteration. The second SHOE operates similarly to the first SHOE. More particularly, the second SHOE, which is in optical communication with the first SHOE, is configured to receive the second image element and is switchable between an active state and an inactive state. When operating in the active state, the second SHOE is configured to diffuse the second image element into the second output rays. When operating in the inactive state, the second SHOE is configured to transmit the second image element without substantial alteration.

In another embodiment, the optical device includes a light diffuser, a first SHOE and a second SHOE. The light diffuser is configured to sequentially receive and diffuse the first and second image elements into first and second diffused image element components, respectively. The first SHOE is configured to receive first diffused image element components and is switchable between an active state and an inactive state. When operating in the active state the first SHOE is configured to deflect the first diffused image element components into the first output rays. When operating in the inactive state the first SHOE is configured to transmit the first diffused image element components without substantial alteration. The second SHOE is optically positioned between the first SHOE and the light diffuser. The second SHOE is configured to receive components of a second diffused image element components and, similar to the first SHOE, is switchable between an active state and an inactive state. When operating in the active state the second SHOE is configured to deflect the second diffused image element components into deflected second output rays. When operating in the inactive state, the second SHOE is configured to transmit the second diffused image element components without substantial alteration.

In one embodiment, each of the first and second SHOEs are configured to switch between the active and inactive states in less than 150 microseconds. The switching time can be as low as two microseconds.

In one embodiment, the first SHOE includes a holographic recording medium that records a hologram, wherein the holographic recording medium includes a monomer dipentaerythritol hydroxypentaacrylate; a liquid crystal; a cross-linking monomer; a coinitiator; and a photoinitiator dye.

In one embodiment, the first SHOE includes a hologram made by exposing an interference pattern inside a polymer-dispersed liquid crystal material. This polymer-dispersed liquid crystal material includes, before exposure: a polymerizable monomer; a liquid crystal; a cross-linking monomer; a coinitiator; and a photoinitiator dye.

In any embodiment described herein, the image generator can include one or more laser scanners each one of which can produce a coherent light beam encoded with image information. The scanner may scan the coherent light beam over a two-dimensional area such as the planar surface of the optical device.

BRIEF DESCRIPTION OF THE DRAWINGS

The present invention may be better understood, and it's numerous objects, features and advantages made apparent to those skilled in the art by referencing the accompanying drawings. The use of the same reference number throughout the Figuer. designates a like or similar element.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

Figure 1:
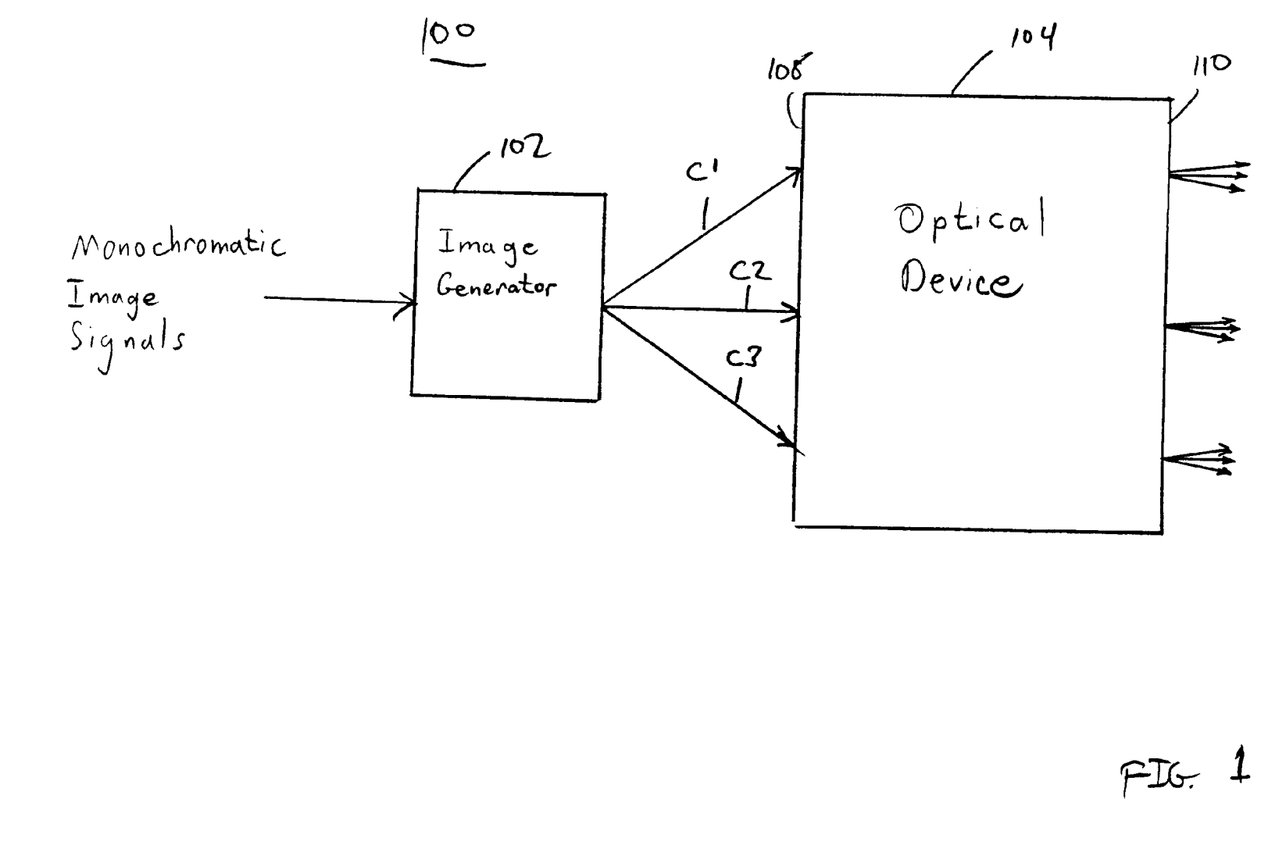
FIG. 1 is a block diagram of a system for generating a three dimensional image employing the present invention.

FIG. 1 is a block diagram illustrating one embodiment of the present invention. More specifically, FIG. 1 shows system 100 for generating a three dimensional image in accordance with the present invention. System 100 includes an image generator 102 in optical communication with optical device 104. Image generator 102 receives monochromatic image signals, and in response, generates respective image elements. As will be more fully described in the preferred embodiment, image generator 102 includes a laser scanner that generates a beam of laser light encoded with data of the monochromatic image signals. More particularly, the intensity of the beam of laser light generated by the laser scanner changes in accordance with data of the monochromatic image signals as the laser beam of light is scanned across a two-dimensional input surface 108 of the optical device 102. Thus, the intensity of the laser light beam at any point in time corresponds to data within a respective monochromatic image signal. FIG. 1 shows three such instances C1–C3 of the laser light beam as the laser light beam is scanned across the input surface 108 of the optical device 104. In one sense, the laser scanner is said to sequentially generate laser light beams each one of which is encoded with image information.

Optical device 104 receives the laser light beams from image generator 102 at surface 108. Although not show, optical device 104 is dynamically controllable in accordance with control signals received either from image generator 102 or in accordance with data contained within monochromatic image signals received by the optical device 104. Optical device 104, in response to receiving the laser beams of light, generate respective bundles of output light rays which collectively, when viewed by an observer, forms a three-dimensional image. FIG. 1 shows output light ray bundles D1–D3 corresponding to laser light beam instances C1–C3, respectively. Output light rays in bundles D1–D3 diverge as they exit from surface 110 of optical device 104. However, the paths of output light rays in each bundle D1–D3 are such that if traced back by an observer, the output light rays in each bundle will appear to originate from points in separate planes. These planes are parallel to the output surface 110.

Figure 2A:
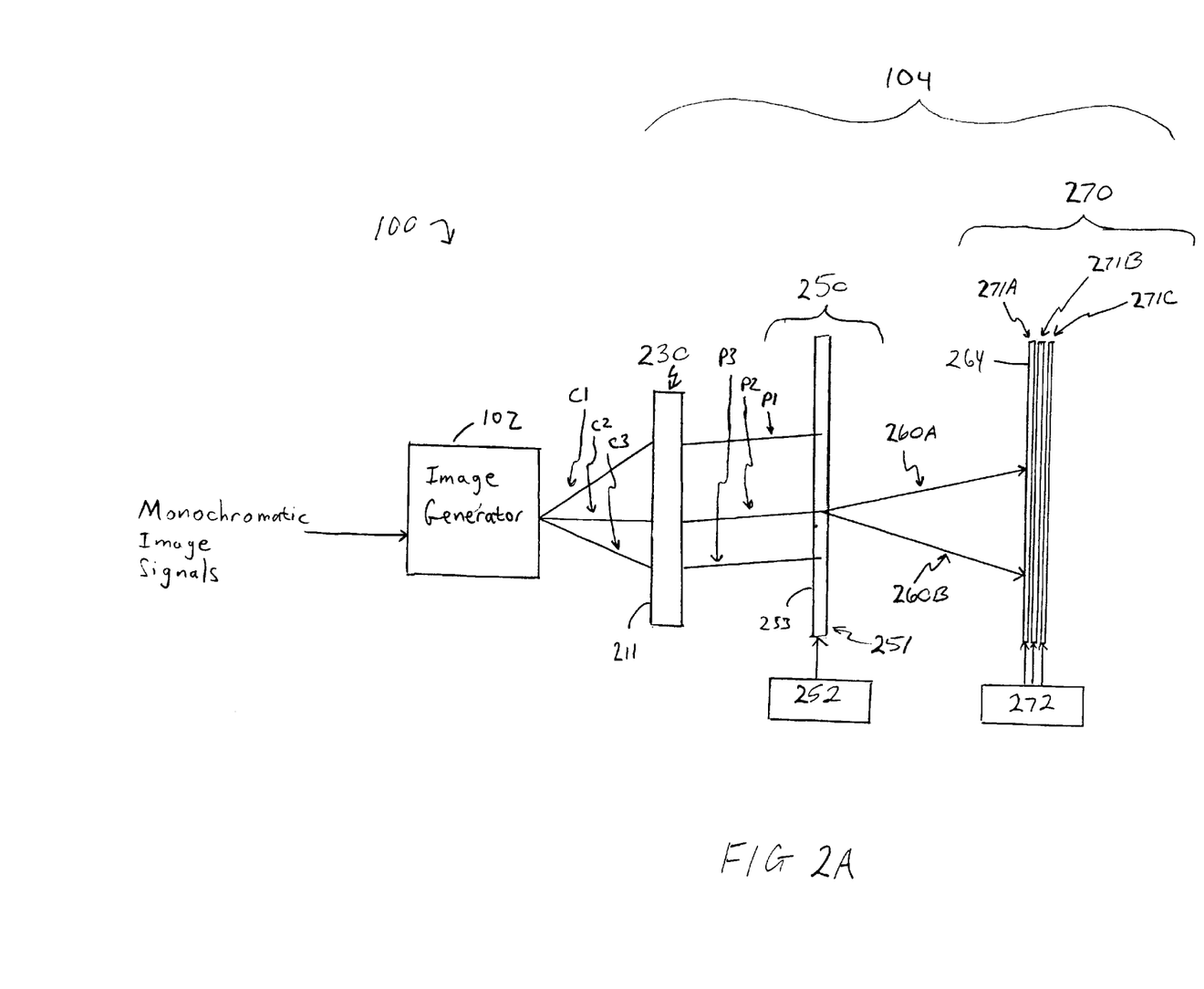
FIG. 2A is a schematic diagram of a first embodiment of the system shown in FIG. 1.

Referring to FIG. 2A, a first embodiment of the system 100 of FIG. 1 is shown. System 100 may include a image generator 102 which is capable of writing an image onto surface 211 of optical system 230 by scanning a beam of laser light in a raster like fashion. The image generator 102 includes a laser scanner (not shown) that generates the beam of laser light in response to the image generator 102 receiving monochromatic image signals. The generated beam of laser light is encoded with information contained in the monochromatic image signals received by the image generator. The laser scanner may vary the intensity of the generated laser beam of light in accordance with the monochromatic image signals as the laser beam of light is scanned across surface 211. The light intensity of the laser light beam at any point in time corresponds to data contained in a respective monochromatic image signal.

The optical device 104 in FIG. 2A includes the optical system 230, an optical diffuser 250, and an optical deflector 270. FIG. 2A shows three instances (designated C1, C2, and C3) of the laser light beam while it is scanned over the two-dimensional input surface of optical system 230. Since the laser light beam originates from a single output point as shown, the laser light beam is received by the optical system at a variety of incidence angles as the laser light beam is scanned over the two-dimensional input surface. The optical system converts the laser light beam respective parallel beams. Thus laser light instances C1, C2, and C3, are converted into parallel beams P1, P2, and P3, respectively.

The optical system 230 may take form in a conventional collimating lens. Alternatively, the optical system may take form in a static holographic optical element or a switchable holographic optical element formed from a polymer dispersed liquid crystal material the latter of which is more fully described in U.S. patent application Ser. No. 09/366,449 entitled Pancake Window Display System Employing One Or More Switchable Holographic Optical Element which is incorporated herein by reference in its entirety.

The parallel laser light beams, including P1, P2, and P3, are received on a first surface 253 of optical diffuser 250. Optical diffuser includes, in one embodiment, a diffusing element 251 coupled to a control circuit 252. Diffuser 250 diffuses or scatters the incident parallel laser light beams, including P1, P2, and P3, into respective bundles of diverging light rays (not shown). The diverging rays of each bundle appear to originate from a common position or point within the diffuser 250 if they were seen by an observer. FIG. 2A shows rays 260A and 260B from separate bundles of scattered parallel beams. Ray 260A or 260B may be from the diverging ray bundle resulting from the diffusion of parallel beam P2.

In the preferred embodiment, the diffusing element 251 includes at least one electrically switchable holographic optical element formed from the polymer dispersed liquid crystal material described in U.S. patent application Ser. No. 09/366,449 entitled Pancake Window Display System Employing One Or More Switchable Holographic Optical Element. This switchable holographic optical element operates between active and inactive states in accordance with control signals received from the control circuit 252. In the active state, the parallel beams are diffused by diffraction. In the inactive state the parallel beams are transmitted through without substantial alteration. It is noted that the switchable holographic optical element of diffuser 250 can be formed from conventional polymer dispersed liquid crystal materials. Moreover, the diffuser 250 may take form in a conventional diffuser formed from glass, plastic or other such material.

Each diverging ray bundle produced by optical diffuser 250 is received on an input surface 264 of optical deflector 270. Optical deflector preferably includes a plurality of switchable holographic optical elements ("SHOEs") 271 (FIG. 2A shows three such SHOEs, 271A, 271B, and 271C, by way of example) formed from the polymer dispersed liquid crystal material described in the incorporated patent application mentioned above. Each of the plurality of switchable holographic optical elements is coupled to control circuit 272. SHOEs 271 are switchable between an active diffracting state and an inactive or passive non-diffracting state in accordance with control signals received from control circuit 272. More than one SHOE can be activated at a time. When active, one or more SHOEs 271 deflect each of the diverging rays in a received bundle to produce a bundle of diverging output rays (not shown). The output rays of each deflected bundle, when seen by an observer, appear to originate from a common point or position outside the diffusing element 251. When all SHOEs 271 are inactive, the diverging rays of each received bundle is transmitted therethrough without substantial alteration so that they appear to originate from the point or position within the optical diffusing element 251 where they were initially scattered.

Each SHOE, as noted above, is switchable between the active and inactive states in accordance with respective control signals received from control circuit 272. The signals which control SHOEs 271 are generated in accordance with the monochromatic image signals. More particularly, activation of one or more SHOEs 271 is timed with the generation of laser light beam encoded with information contained in respective image signal. Stated differently, the one or more SHOEs which are activated at any point in time is determined by the monochromatic image signal information encoded in the laser light beam generated at that time. The activation of the SHOEs are timed so that the optical device generates a three-dimensional image when an observer eye integrates the output rays of several bundles.

Figure 2B:
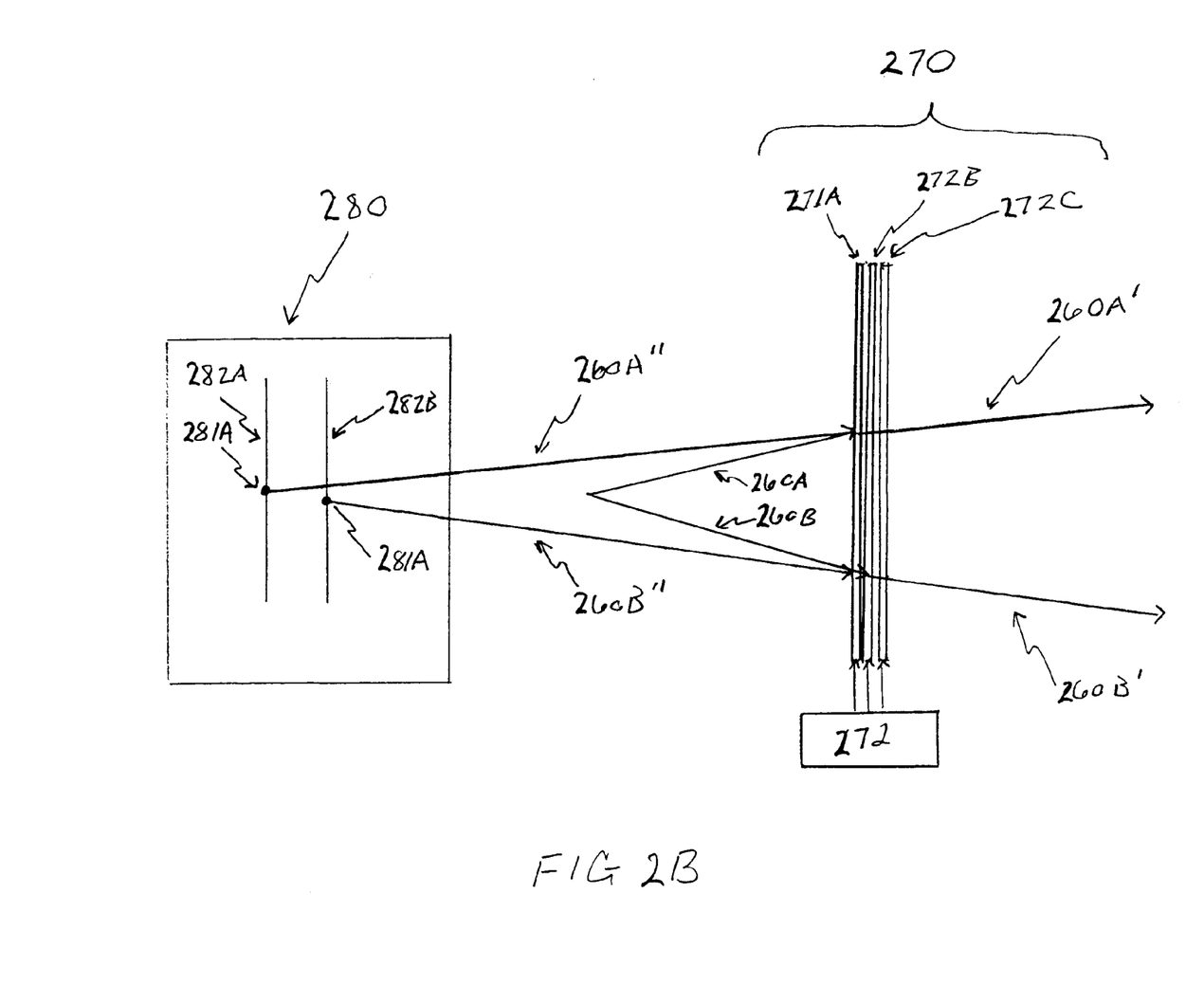
FIG. 2B illustrates operational aspects of the system shown in FIG. 2A.

Referring to FIG. 2B, light rays 260A and 260B of separate light ray bundles produced by diffuser 250 are again shown for purposes of illustration. Light rays 260A and 260B are incident on deflector 270. Light rays 260A and 260B are altered by deflector 270 such that the light rays 260A and 260B emerge from deflector 270 as deflected output light rays 260A' and 260B' respectively, having an exit angle which is different than the incident angle of light rays 260A and 260B, respectively. It is noted that all incident light rays of a bundle with the same incident angle will emerge as deflected light rays having substantially the same exit angle. Moreover, incident light rays of a bundle with different incident angles will emerge as deflected rays having substantially different exit angles.

Deflected output rays 260A' and 260B' (and deflected output rays of their respective bundles) appear to originate from points 281A and 281B, respectively, when seen by an observer. Vectors 260A" and 260B" in FIG. 2B represent the extended paths of deflected output light rays 260A' and 260B' respectively, if deflected output light rays 260A' and 260B' were traced back to their apparent points of origin, 281A and 281B, respectively, by an observer. FIG. 2B shows that the apparent points of origin 281A and 281B are spaced from the actual points of origin 285, a position within the plane of the diffuser 251. Planes 282A and 282B, shown in FIG. 2B perpendicular to the plane of the figure, are planes containing points 281A and 281B, respectively. Planes 282A and 282B are parallel to each other.

Each beam of laser light generated by image generator 102 can be scattered and deflected by the system in FIG. 2A into diverging output rays which appear to originate from any one of many points within image volume 280. The point at which the diverging output rays appear to originate depends on the optical power of the deflector 270 which, in turn, depends on which SHOEs 271 are activated. By adjusting the optical power of optical deflector 270 (i.e., activating the appropriate SHOEs 271) for each generated laser light beam encoded with image information, a three-dimensional image in volume 280 may be perceived by an observer.

The optical diffuser 250 is preferably formed from a layer of polymer dispersed liquid crystal material described in the incorporated patent application above. This material may include a medium populated by randomly distributed liquid crystal micro-droplets interspersed by regions of clear photopolymer. The liquid crystal droplets are either suffused into pores in the polymer, or preferably, formed as a result as phase separation of an initially homogenous mixture of liquid crystal and pre-polymers under polymers under illumination by light or other radiation. The PDLC layer the diffuser 250 or each SHOE 271 is preferably electrically switchable by means of electrodes between which it is sandwiched. When no voltage is applied to these electrodes, liquid crystal droplets tend to scatter light incident on them. When a suitably high voltage is applied the droplets are re-oriented such that their refractive index matches that of the surrounding polymer, and the PDLC layer becomes transparent. Between these extremes, the liquid crystal droplets scatter light to a degree dependent on the magnitude of the applied voltage. Switching voltages are typically in the range of 40–60 volts (peak to peak) for transmission type SHOEs and over 100 volts (peak to peak) for reflective type SHOEs. The switching voltage may be reduced to around 1–2 volts per micron thickness of hologram within the SHOE. This would result in switching voltages of around 10–20 volts. The scattering characteristics of the diffuser 250 can be controlled to match requirements by suitably varying the voltage applied by means of control circuit 252. The size and shape of the liquid crystal droplets can be controlled during manufacture of the PDLC layer to scatter light predominantly in the viewing direction. Where control of the scattering characteristics is not required, diffuser 250 can be composed of a conventional diffusing material.

Because the laser light beams are parallel when they reach diffuser 250, the polar diagram of the scattered rays of each bundle produced by the diffuser is uniform over most of its area. The parallel laser light beams are received by diffuser 250 at a relatively steep incidence angle. As such, light in those beams not actually scattered, emerge at angles such that it does not interfere with the viewing of the scattered light in the ray bundles.

Deflector 270 alters the angle of divergence of rays in each bundle of scattered rays. The degree to which the divergence angles are altered is varied by adjusting the optical power of deflector 270 by switching (in a manner discussed below) appropriate elements 271 into and out of activation. Each element 271 has its own unique optical power. The optical power of deflector 270 is adjusted to a particular value by switching individual elements 271 into activation alone or in combination with other elements 271. The optical power of deflector 270 at any given time is a function of the optical powers of the elements 271 activated at that time.

In FIGS. 2A and 2B, deflector 270 is shown as including three elements 271A, 271B, and 271C, for purposes of illustration. Deflector 270 can comprise more or fewer elements 271. If deflector 270 comprises N elements 271, then deflector 270 can be adjusted to $2^N$ different optical powers. Each different optical power results in a different point at which an output ray bundle appears to originate in image volume 280. More optical power values results in greater depth resolution within image volume 280. For example, if deflector 270 comprises eight elements 271, output rays of image elements may appear to originate from one of 256 different planes. If deflector 270 comprises seven elements 271, image elements may appear to originate from one of 128 different planes.

SHOEs 271 include holograms that have been pre-recorded into a medium. These can be thin-phase holograms (i.e., holograms that conform to the Raman-Nath regime) or they can be volume holograms, also known as thick or Bragg holograms. Use of volume holograms is preferred because they offer high diffraction efficiencies for incident beams whose wavelengths are close to the theoretical wavelength satisfying the Bragg diffraction condition.

To facilitate switching of the SHOEs between active, diffracting and passive non-diffracting states, the recording medium is typically a polymer-dispersed liquid crystal ("PDLC") mixture described in the incorporated patent application, that undergoes phase separation during the hologram recording process, creating fringes comprising regions densely populated by liquid crystal micro-droplets interspersed with regions of clear polymer. When an electric field is applied to the hologram by way of electrodes, the natural orientation of the liquid crystal droplets is changed, reducing the refraction index modulation of the fringes and the hologram diffraction efficiency, effectively erasing the hologram. Using such a system and method, it is possible to achieve switching times of less than 150 microseconds. It is possible to achieve faster switch times, with response times of tens of microseconds (response times as small as a few (e.g., 2) microseconds have been demonstrated) and relaxation times also measured in tens of microseconds. There is a trade-off between switching voltage and switching time with higher voltages being required for shorter switch times.

Where a colored three-dimensional image is to be generated, the image generator may include three distinct laser scanners each one of which is configured to generate a beam of laser light in a respective one of the red, green, and blue visible bandwidths. Each of these beams of laser light will be encoded with corresponding image information (i.e., red, green, or blue image information) contained in received polychromatic image signals. Ideally, these laser light beams will be generated so that the input surface of the optical system 230 simultaneously receives the laser light beams from all three laser scanners. The optical system 230 ideally would include three separate SHOEs each of which is configured to convert laser light beams with varying incidence angles into parallel laser light beams. Each SHOE of the color optical system 230, when active, acts on a specific visible bandwidth while transmitting light of other bandwidths without substantial alteration. Optical diffuser 250 in this colored system will preferable include three distinct SHOEs each one of which is configured to scatter a respective bandwidth of visible light when active while transmitting other light with little or no alteration. The SHOEs of each of the optical system 230 and the optical diffuser 250 may be active during the entire time the colored three-dimensional image is being generated. Where cross-talk between the different bandwidths is unlikely to be a problem, the SHOEs of the optical system 230 and/or the diffuser 250 can be non-switchable and can be incorporated into a single structure.

Optical deflector 270 of the color system may include three separate sets of switchable SHOEs 271 where the SHOEs of each set is designed to deflect laser light of a respective bandwidth (e.g., the red, green, and blue visible bandwidths). Each set of SHOEs may be physically separated from each other. Alternatively, the SHOEs of each set may be arranged in groups of three so that each SHOE in a group is configured to deflect light of a respective one of the red, green, and blue visible bandwidths, and so that each SHOE in a group has the same optical power (i.e., SHOEs in each group of three deflects rays in a diverging bundle to produce output rays which appear to originate from the same or nearly the same point in image volume 280). In this alternative embodiment, SHOEs in each group of three may be formed by three separate holograms formed between a single pair of transparent electrodes so that the SHOEs in each group of three may be controlled by a single control signal coupled to the electrodes.

Figure 3:
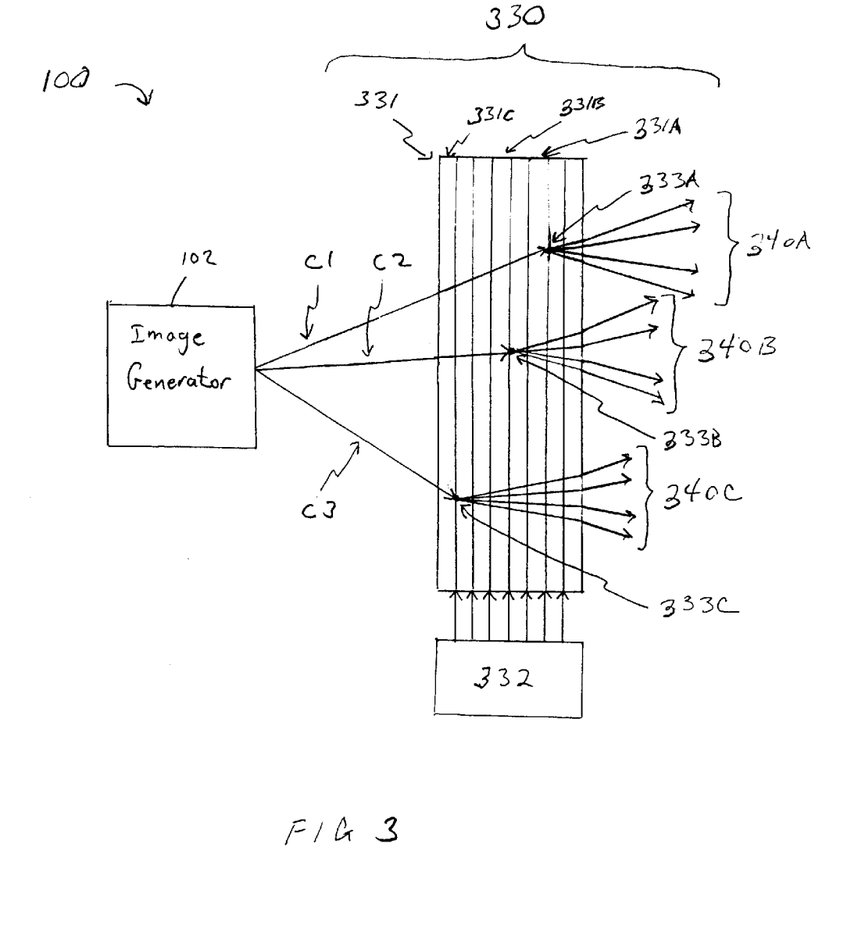
FIG. 3 is a schematic diagram of a second embodiment of the system of FIG. 1.

Referring to FIG. 3, a second embodiment of the system 100 of FIG. 1 is shown. The image generator of FIG. 3 includes a laser scanner similar to that described in FIG. 3. The optical device 104 shown in FIG. 3 is different from that shown in FIG. 2A. More particularly, the optical device 104 of FIG. 3 includes an optical diffuser 330. Diffuser 330, in turn, includes a stack of SHOEs 331 each one of which is coupled to a control circuit 332. The optical diffuser 330 receives laser light beam from the laser scanner on an input surface thereof. The laser light beam is encoded with image information of monochromatic image signals received by image generator 104 as it is scanned across the input surface of diffuser 330 in a raster like fashion. Again, at any given point in time, the laser light beam's intensity corresponds to image information contained in a respective monochromatic image signal. In response to receiving each encoded laser light beam, optical diffuser 330 diffuses or scatters the laser light beam into a bundle of diverging output rays. Each SHOE 331 includes a layer of PDLC material sandwiched between a pair of transparent electrodes. When a suitably high voltage is applied between the electrodes, the droplets are re-oriented such that their refractive index matches that of the surrounding polymer and the PDLC layer becomes transparent. Thus, each SHOE 331 is switchable between an active diffusing state and an inactive non-diffusing state, controlled by control circuit 332.

FIG. 3 shows three instances C1, C2, and C3 of the laser beam as it is scanned across the input surface of diffuser 330. Each instance is encoded with distinct image information. When the laser light beam is at position corresponding to instance C1, SHOE 331A is activated by control circuit 332 and produces a bundle of divergent output rays ("ray bundle") 340A emanating from scatter center 333A. Similarly, for instance C2, SHOE 331B produces output ray bundle 340B from center 333B, and for instance C3, SHOE 331C produces output ray bundle 340C from center 333C.

The plurality of scattering centers 333, of which centers 333A, 333B, and 333C are examples, along with other centers 333 not shown, are spaced apart from one another in a direction perpendicular to the plane of the two-dimension input surface on which the laser light beam is projected, i.e., centers 333 are at different depths within the stack of SHOEs 331. This process is repeated for all image elements of the three-dimensional image within the eye integration time. Thus, an observer perceives the three-dimensional within the stack of SHOEs 331.

Figure 4:
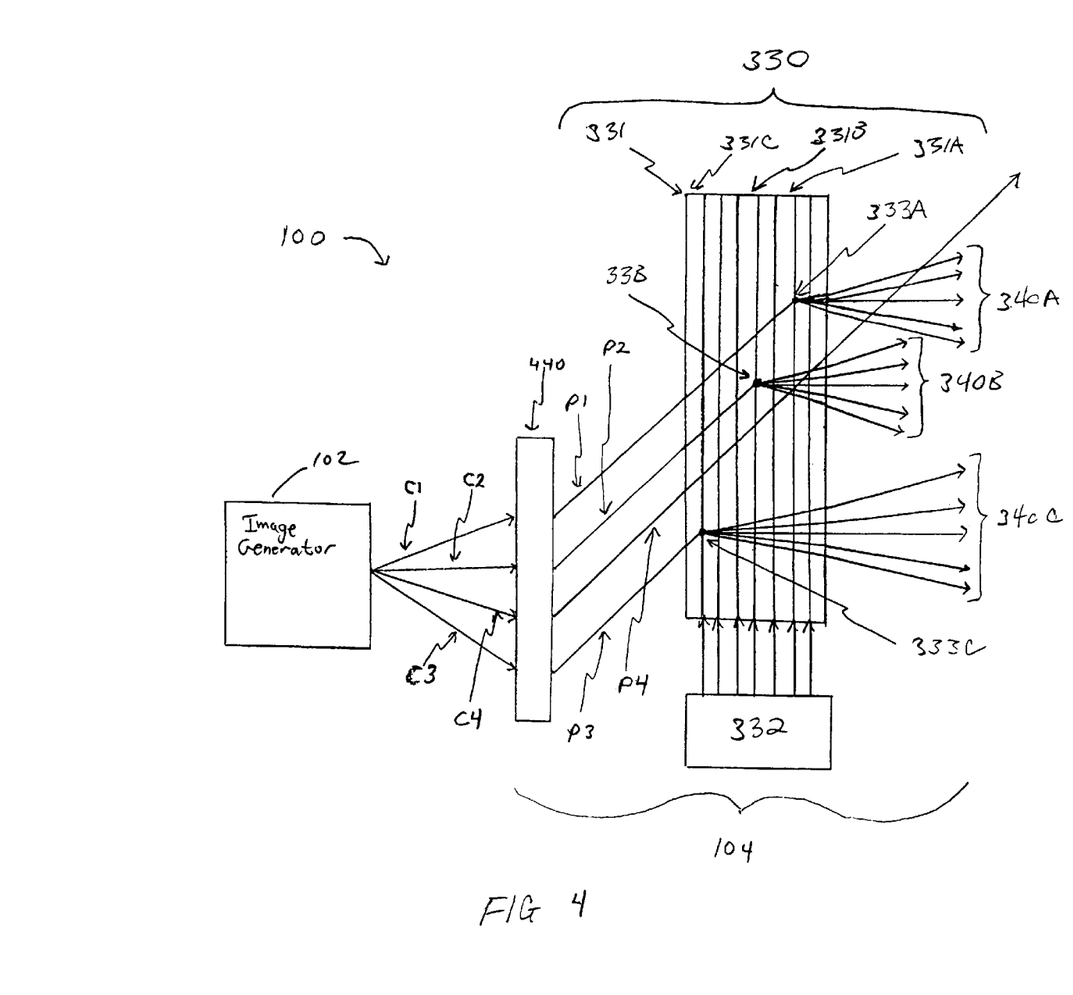
FIG. 4 is a diagram of a third embodiment of system shown in FIG. 1.

Referring to FIG. 4, another embodiment of system 100 is shown. The system of FIG. 4 is similar to that shown on FIG. 3. In FIG. 4, an optical system 440 is interposed between image generator 102 and diffuser 330. System 440, like optical system 230 shown in FIG. 2A, converts the laser beams generated by the image generator 102 into parallel beams to produce more uniform behavior when subsequently scattered by diffuser 330. In contrast to FIG. 2A, the parallel beams produced by optical system 440 emerge therefrom at a non-normal angle. Light beams, or components thereof, that are not scattered by diffuser 330 emerge from diffuser 330 at such a steep angle from the direction perpendicular to the input surface of diffuser 330 that they do not interfere with the viewing of the resulting three-dimensional image. FIG. 4 shows one example P4 of a laser beam which is not scattered by diffuser 330.

Figure 5:
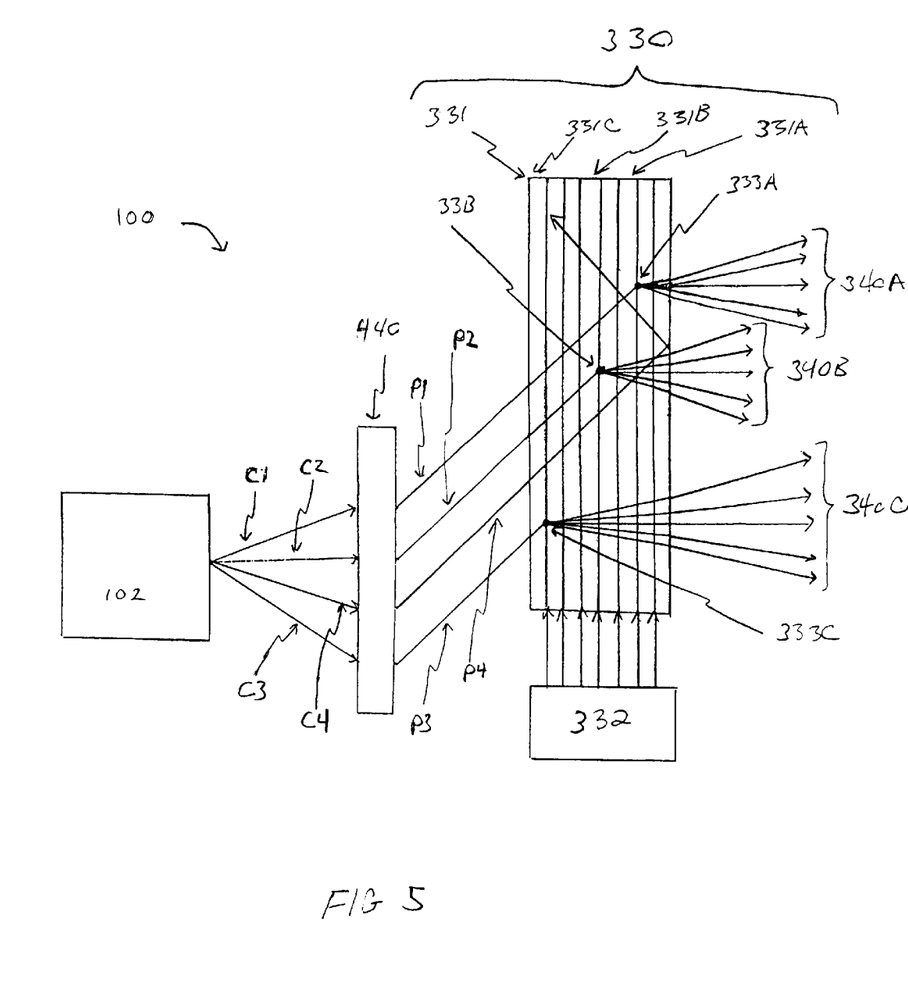
FIG. 5 is a diagram of a fourth embodiment of system shown in FIG. 1.

Referring to FIG. 5, still another embodiment of the system 100 is shown. The system of FIG. 5 is similar to that shown in FIG. 4. In FIG. 5, the components are arranged such that parallel beams produced by optical system 440 are incident on diffuser 330 at a greater than critical angle. Non-scattered light beams are totally internally reflected by the interface between the last diffuser SHOE 231 in the stack and the surroundings and emerge from diffuser 330. Beam P4 is shown in FIG. 5 as an example of one of these reflected beams. Thus, internally-reflected beams do not interfere with the viewing of the resulting three-dimensional image. Alternatively, laser beam light not scattered may be rejected using Schlieren techniques.

Figure 6:
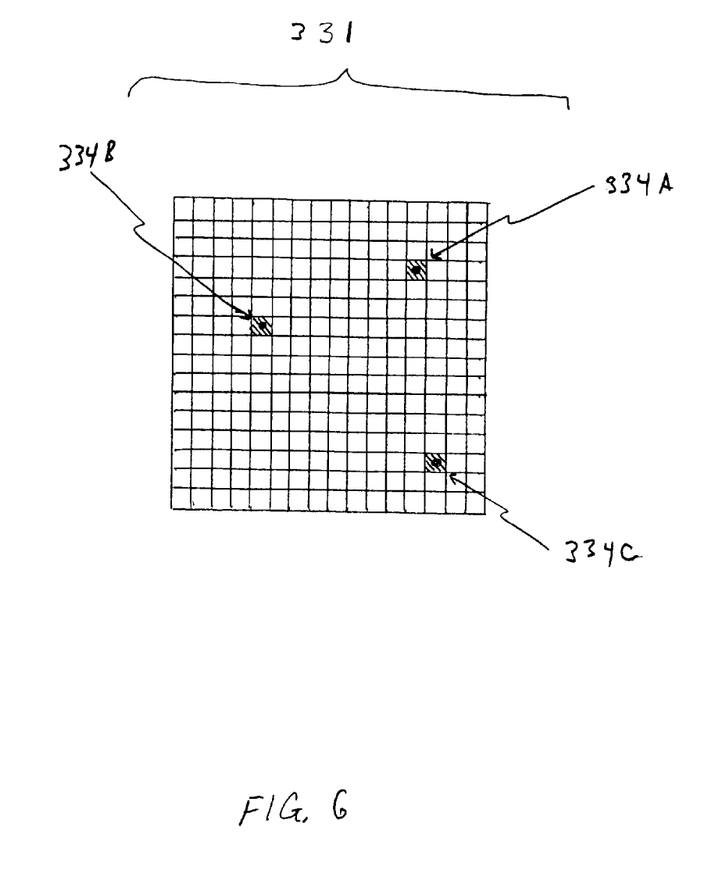
FIG. 6 is a schematic diagram of a switchable holographic optical element employable one embodiment of the present invention.

Referring to FIG. 6, an alternative configuration of diffuser 330 is shown. Each diffuser SHOE 331 may be configured as an array of SHOEs 234 that are individually switchable between their active and inactive states. Application Ser. No. 09/418,731 filed Oct. 15, 1999 and entitled Light Intensity Modulator Based On Electrical Switchable Holograms, which is incorporated herein by reference in its entirety, describes an array of SHOEs. FIG. 6 shows a view of one diffuser SHOE 331 "face-on," at an angle perpendicular to the viewing angle used for FIGS. 2A, 2B, 3, 4, and 5. Three individual discrete SHOES 334A, 334B, and 334C, are indicated as examples.

Figure 7:
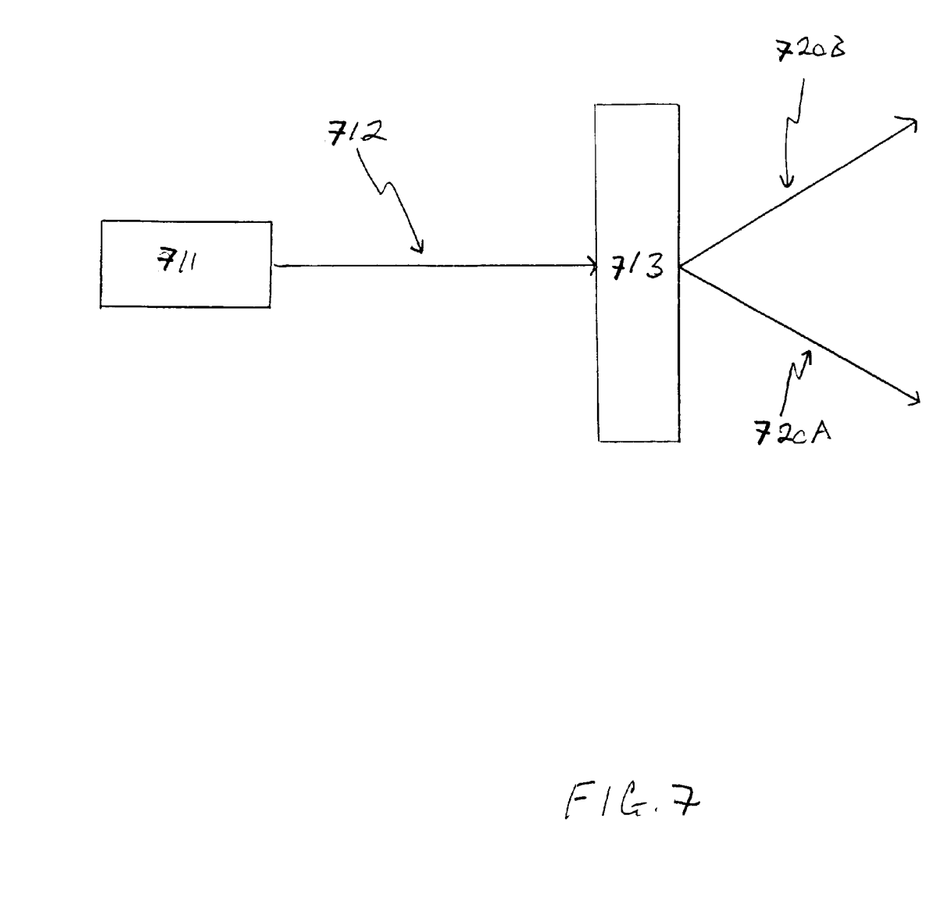
FIG. 7 is a schematic diagram of one laser scanner employable in one or more of the embodiments of the system shown in FIG. 1.
Figure 8:
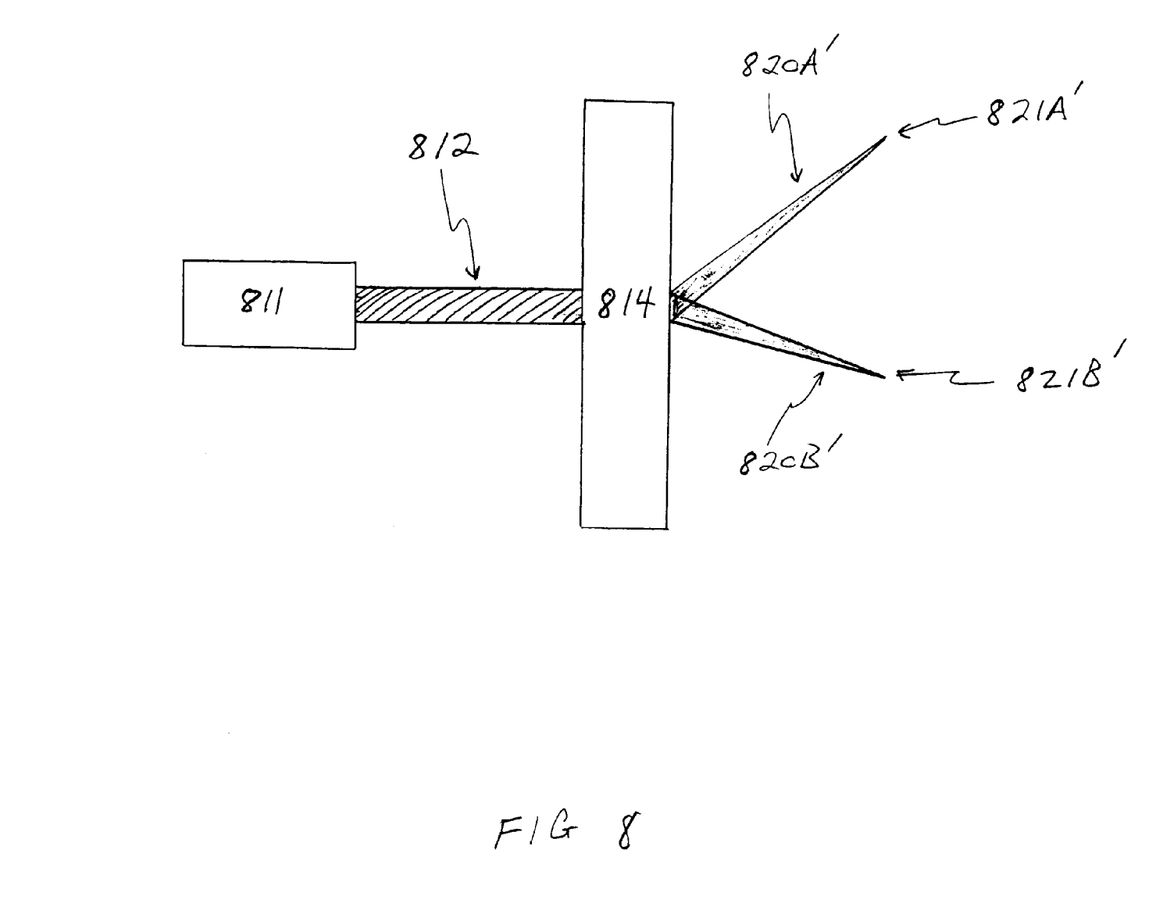
FIG. 8 is a schematic diagram of another laser scanner employable in one or more of the embodiments of the system shown in FIG. 1
Figure 9:
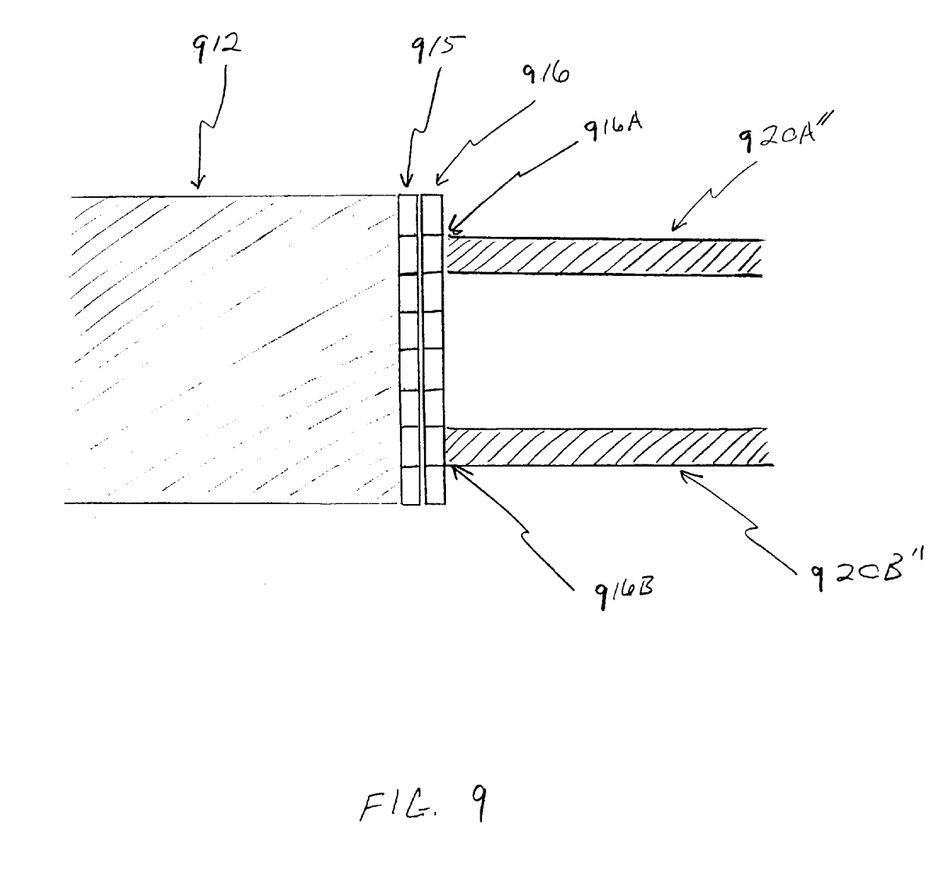
FIG. 9 is a schematic diagram of yet another laser scanner employable in one or more of the embodiments of the system shown in FIG. 1.

FIGS. 7–9 show implementation examples for a laser scanner employed in the image generator described above. In FIG. 7 laser beam 712, generated by laser scanner 711, is deflected by means of an electro-optical or mechanical device 713 into beams 720, of which two, 720A and 720B, are shown. Referring to FIG. 8 laser scanner 810 includes a system 814 that includes focusing optics for focusing the laser beam 812, down to small spots 821. Focussed beams 820A' and 820B' and spots 821A and 821B are shown. FIG. 9 shows scanner 910 including a spatial light modulator 915 and an array of microlenses 916 (of which two, 916A and 916B, are indicated) that generate narrow beams 920", of which two, 920A' and 920B", from incident laser beam 912 (represented as having finite width), are shown.

Figure 10:
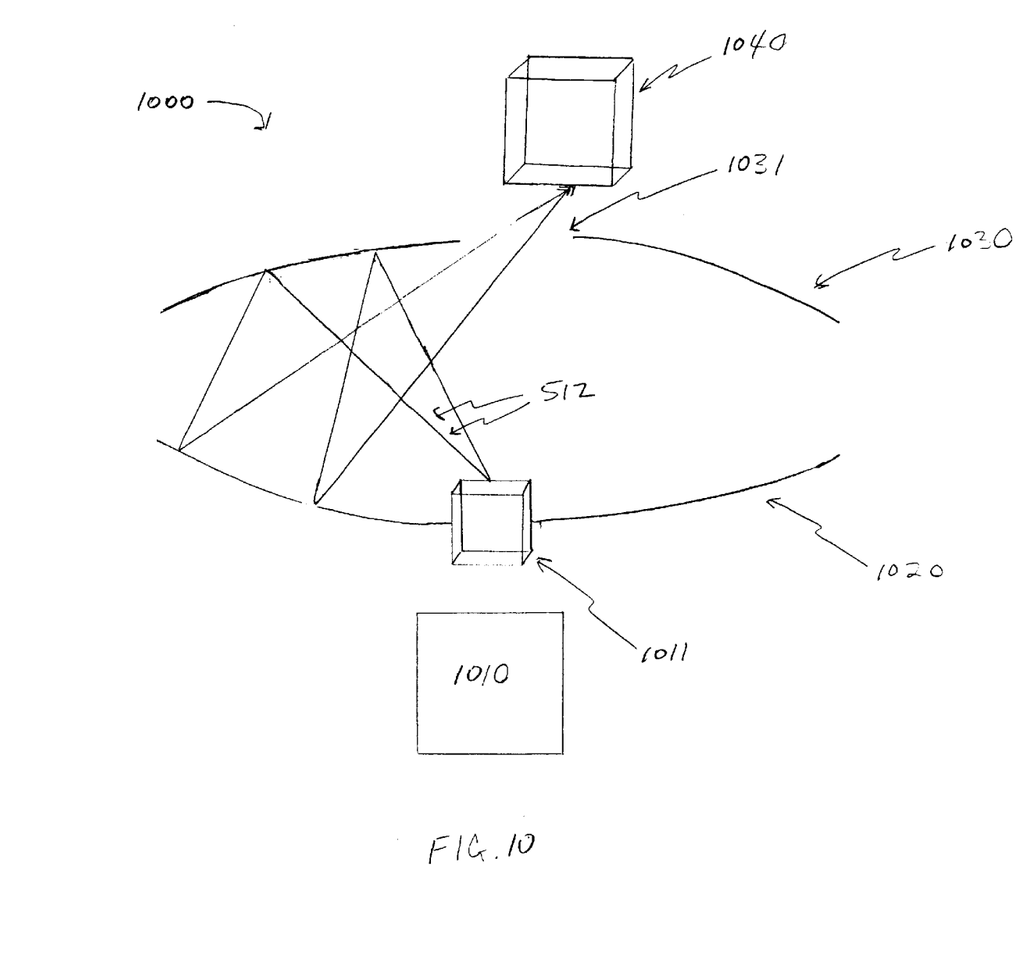
FIG. 10 is a schematic diagram of another system for generating a three dimensional image employing the present invention.

FIG. 10 shows, an arrangement 1000 in which the three-dimensional image produced by the system of the present invention is used to form a further three-dimensional image by means of a magnifying system. For purposes of illustration, the apparatus embodying the invention described herein is designated 1000 in FIG. 10, but any embodiment described herein can be used in its place. The three-dimensional image 1011 produced by apparatus 1010 is formed at a central area of a curved mirror 1020. A second curved mirror 1030 with an aperture 1031 at its center faces mirror 1020. Light rays from image 1010 are reflected first by mirror 1030 then by mirror 1020. These reflections magnify image 1010 and focus it through aperture 1031 to form magnified three-dimensional image 1040. Other magnifying configurations, not shown, are possible.

The various embodiments described herein have varied applications, including computerized axial tomography (CAT) scanners, laser scanners, radar systems, bubble chambers, molecular structure analysis and computer aided design. The quality of the three-dimensional image produced by the embodiments depends on the number of image planes that are used to reconstruct the image, which will determine the lateral resolution of the image. In those embodiments that use SHOEs, the lateral resolution depends on scanner bandwidth and the limiting resolution of the PDLC material used in the SHOEs. The requirement for a particular lateral resolution varies from one application to another, but for certain applications, the aim is not to represent a single object in a three-dimensional image volume but rather to show data in a visually informative manner, which will often require only a relatively small number of image planes.

Where a large number of image planes are required for high lateral resolution, a relatively large number of SHOEs and/or diffuser elements (depending on the embodiment of the present invention), will be required. In those circumstances, it is also preferable to use highly efficient anti-reflection coatings on the surfaces of the SHOEs and diffuser elements, along with high quality hologram substrates.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. An apparatus comprising:
    a light generator configured to receive image signals, wherein the light generator is configured to sequentially generate light beams in response to receiving the image signals;
    a light diffuser configured to sequentially receive and diffuse each of the light beams into respective light beam components;
    a first switchable holographic optical element (SHOE) configured to receive first components of a first light beam diffused by the diffuser, wherein the first SHOE is switchable between an active state and an inactive state, wherein the first SHOE is configured to deflect the first components into deflected first components when operating in the active state, and wherein the first SHOE is configured to transmit the first components without substantial alteration when operating in the inactive state;
    second SHOE optically positioned between the first SHOE and the light diffuser, wherein the second SHOE is configured to receive components of a second light beam diffused by the diffuser, wherein the second SHOE is switchable between an active state and an inactive state, wherein the second SHOE is configured to deflect the second components into deflected second components when operating in the active state, and wherein the second SHOE is configured to transmit the second components without substantial alteration when operating in the inactive state.

2. The apparatus of claim 1:
    wherein the diffracted first components, when traced back opposite to the direction of their propagation, appear to originate from a first common point, wherein the diffracted second components, when traced back opposite to the direction of their propagation, appear to originate from a second common point;
    wherein the first and second common points are contained in first and second planes, respectively, wherein the first and second planes are distinct from each other, wherein the first and second planes are parallel to each other, and wherein the first plane is positioned adjacent the first SHOE.

3. The apparatus of claim 2 wherein the first SHOE is configured to deflect the deflected first components to produce twice deflected first components when the first SHOE operates in the active state, wherein the first SHOE is configured to transmit the deflected first components without substantial alteration when operating in the inactive state, and wherein the twice deflected first components, when traced back, appear to originate from a third common point, wherein the third common point is distinct from the first and second common points.

4. The apparatus of claim 1 wherein the first light beam defines a picture element of a first two dimensional image, wherein the second light beam defines a picture element of a second two dimensional image.

5. The apparatus of claim 1 wherein the first and second light beams define separate image elements of a two dimensional image.

6. The apparatus of claim 1 wherein the deflected first and second beam components define first and second image elements, respectively, of a three dimensional image.

7. The apparatus of claim 1 wherein an intensity of each of said light beams corresponds to a respective image signal received by the light generator.

8. The apparatus of claim 1 wherein the light generator is configured to scan the light beams across a two dimensional plane.

9. The apparatus of claim 1 wherein the first SHOE is configured to switch between the active and inactive states in less than 150 microseconds.

10. The apparatus of claim 1 wherein the first SHOE comprises a holographic recording medium that records a hologram, wherein the holographic recording medium comprises:
    a monomer dipentaerythritol hydroxypentaacrylate;
    a liquid crystal;
    a cross-linking monomer;
    a coinitiator; and
    a photoinitiator dye.

11. The apparatus of claim 1 wherein the first SHOE comprises a hologram made by exposing an interference pattern inside a polymer-dispersed liquid crystal material, the polymer-dispersed liquid crystal material comprising, before exposure:
    a polymerizable monomer;
    a liquid crystal;
    a cross-linking monomer;
    a coinitiator; and
    a photoinitiator dye.

12. The apparatus of claim 1 further comprising a third SHOE, wherein the first SHOE is configured to deflect light of a first bandwidth when operating in the active state, wherein the third SHOE is configured to deflect light of a second bandwidth when operating in the active state, wherein the first SHOE is configured to transmit light of the second bandwidth without substantial alteration when operating in the active state, wherein the third SHOE is configured to transmit light of the first bandwidth without substantial alteration when operating in the active state, wherein each of the first and third SHOEs are configured to transmit light of both the first and second bandwidths without substantial alteration. when operating in the inactive state, and wherein the first and second bandwidths are different from each other.

13. The apparatus of claim 1 wherein an intensity of each of said light beams corresponds to a magnitude of a respective image signal received by the light generator.

14. The apparatus of claim 1 wherein the first plane, the second plane and the light generated are positioned on one side of the second SHOE.

* * * * *